Jan. 1, 1963   C. W. FRITZE ETAL   3,071,753
DATA PROCESSING SYSTEM WITH REMOTE INPUT-OUTPUT DEVICE
Filed April 17, 1958   6 Sheets-Sheet 1

INVENTORS
CURTIS W. FRITZE
VALERIUS E. HERZFELD

Jan. 1, 1963  C. W. FRITZE ETAL  3,071,753
DATA PROCESSING SYSTEM WITH REMOTE INPUT-OUTPUT DEVICE
Filed April 17, 1958  6 Sheets-Sheet 2

INVENTORS
CURTIS W. FRITZE
VALERIUS E. HERZFELD

BY *Cushman, Darby & Cushman*
ATTORNEYS

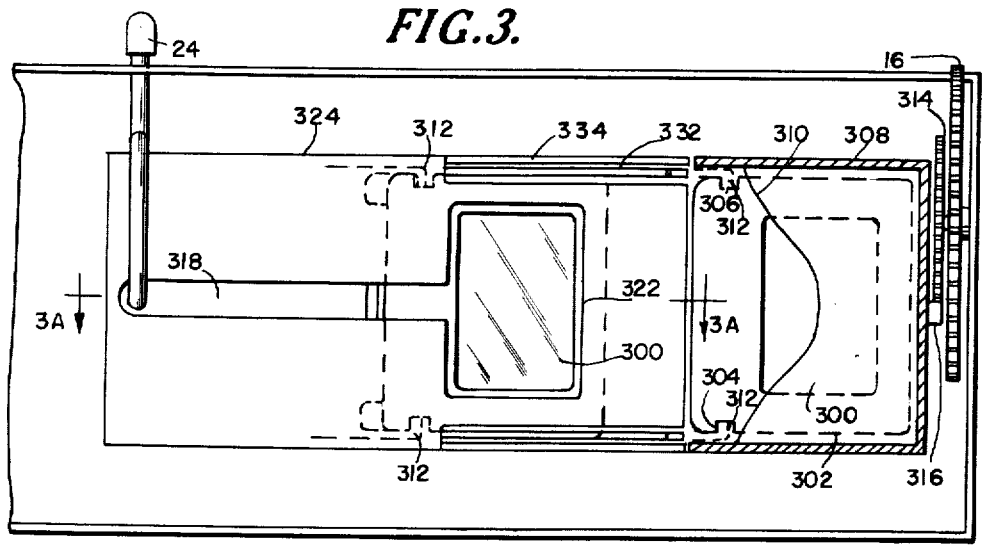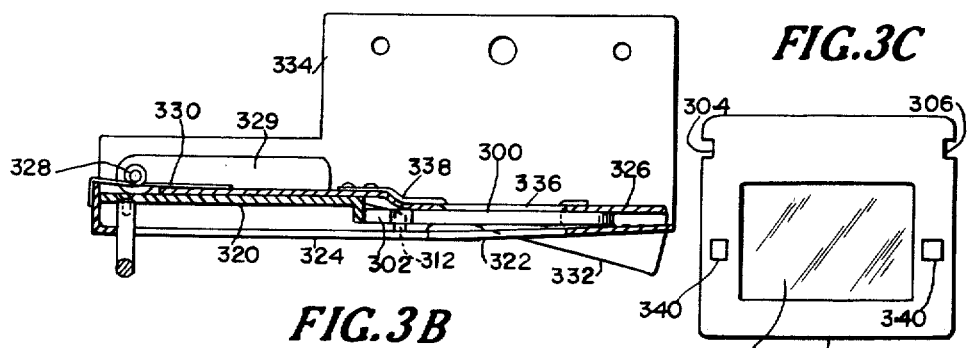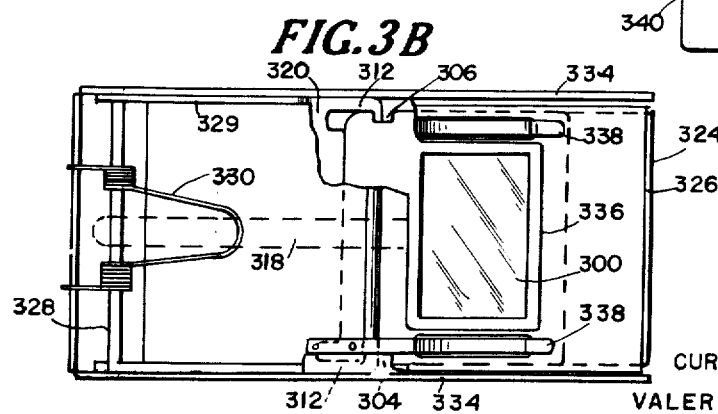

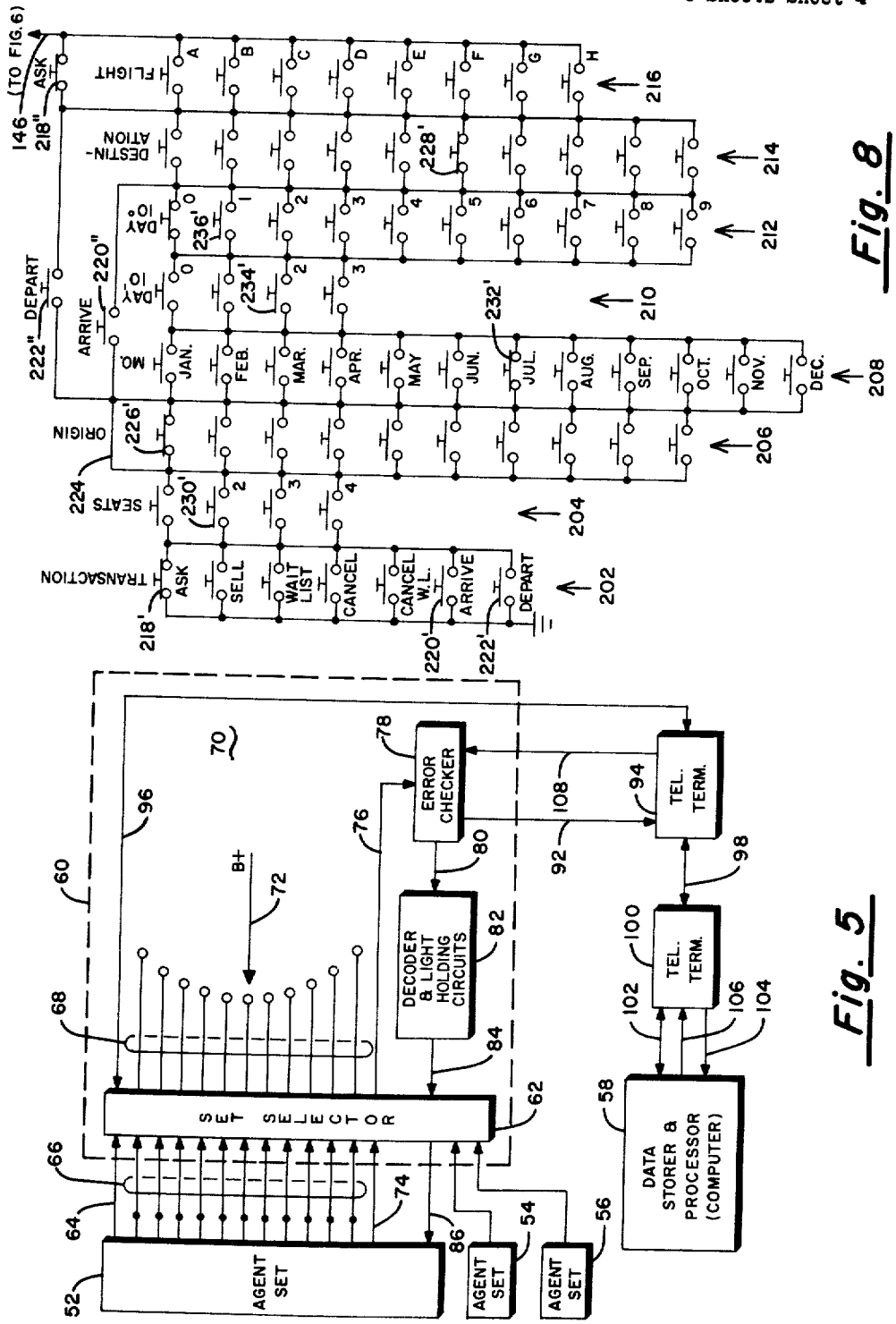

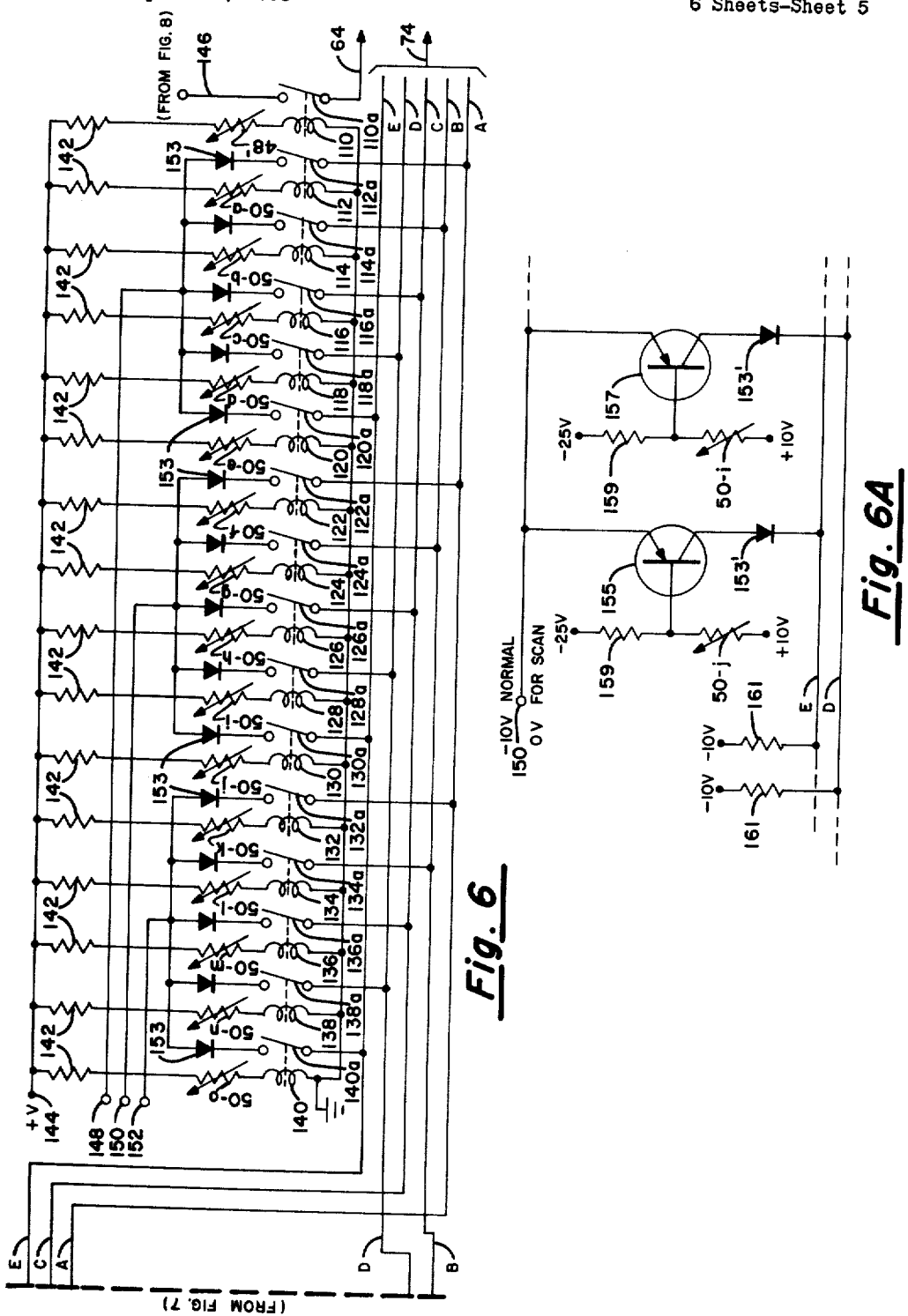

United States Patent Office 3,071,753
Patented Jan. 1, 1963

3,071,753
DATA PROCESSING SYSTEM WITH REMOTE
INPUT-OUTPUT DEVICE
Curtis W. Fritze, Arden Hills, and Valerius E. Herzfeld,
St. Paul, Minn., assignors to Sperry Rand Corporation,
New York, N.Y., a corporation of Delaware
Filed Apr. 17, 1958, Ser. No. 729,122
11 Claims. (Cl. 340—153)

This invention relates generally to peripheral equipment for a data processing system and more specifically to an input-output device such as the operator's portion thereof.

Many business operations such as retail department stores, chain grocery stores, and railroad or airline ticket offices are spread out over large areas thereby creating delays in communication and activity coordination. By providing a centralized data processing system having remotely located peripheral or input-output equipment, the gathering and dispersion of information is greatly enhanced. Such a data processing system when applied to the abovementioned business operations effects a reduction in necessary inventories, improved customer service, quickly consummated sales and increased profits for the user.

In order to realize these goals, there is need for an operator's console which is capable of transmitting large quantities of diversified information into a data processing system in an extremely short time virtually without error.

Accordingly, it is an object of the present invention to provide an operator type of peripheral equipment for a data processing system.

Another object of this invention is the provision in an operator's console of a method and means for projecting tabulated information in the form of photographic slides on a screen for visual observation by an operator.

A further object of the present invention is the provision in an operator's console of a code transmitting device utilizing light sensitive devices for conveying coded information from a photographic slide to a data processing system.

Still another object of this invention is the provision in an operator's console of a plurality of push-button switches arranged in keyboard fashion to provide a means of interrogating the central computer as to one of the specific categories of stored information by instructing the computer to follow a stored program.

A yet further object of this invention is the provision in an operator's console of suitable indicating lights and associated circuitry to visually display the answer returned from the central computer.

A still further object is the provision in an operator's console of suitable storage facilities for the photographic slide timetables and means for selecting and positioning one slide out of a plurality of slides so that the information contained thereon will be displayed on a screen.

Still other objects and advantages of this invention will become apparent to those having ordinary skill in the art by reference to the following detailed description of the exemplary embodiments of the apparatus and the appended claims. The various features of the exemplary embodiments according to this invention may best be understood with reference to the accompanying drawings, wherein:

FIGURE 3 illustrates a front elevational view of an exemplary embodiment of slide selecting and positioning apparatus;

FIGURE 3A is a view of FIGURE 3 along lines 3A—3A;

FIGURE 3B is a plan view of FIGURE 3A;

FIGURE 3C illustrates a slide with a frame usable with the apparatus of FIGURE 3;

FIGURE 5 is a block diagram of a partially complete system showing how several operators' consoles functioning in conjunction with one another and with the central data processing system, and FIGURES 6, 6A, 7 and 8 illustrate schematically the circuitry usable within an agent's set to encode the information delivered to the computer, FIGURE 6A being a partial schematic of a modification of FIGURE 6.

For exemplary purposes, the input-output device of this invention will be hereinafter referred to as an operator's console or an agent's set which is employed in an airlines reservation system. It is to be understood, however, that the application of the invention to an airlines reservation system is not limitative of the invention, since as previously indicated, the input-output device can be applied to many different types of businesses.

Because airline ticket offices are spread out over a large area, it is imperative that a communications link be provided which will keep each ticket agent constantly informed on the status of a large number of flights as to space availability and time schedule. The function of the agent's set is to provide the agent with a means of interrogating a digital data processing system with reference to one of the specific categories of previously stored information. The agent's set of this invention is capable of identifying the information contained in the computer memory and requesting transmission to it of the portion of information of interest to the agent, or modification of the information in accordance with instructions sent from the agent's set.

In normal operation of airlines equipment, it is necessary that space for a particular flight be reserved so that a customer can be assured of flight space on all branches of his trip. In present systems, the reservation request is generally handled by commercial communications equipment such as by telephone, telegraph, etc. The ticket agent checks for a reservation or a group of reservations by inquiring for space availability, waiting list accommodations, and so forth. To do so requires that each flight leg must be checked if the customer desires passage on only part of a flight.

To speed up the time required to check each reservation, the present invention provides for an input-output piece of equipment which may be remotely located and which functions in conjunction with an electronic data processing system thereby providing an airlines reservation system which is a completely automatic central intelligence system for storing information of seat availability by date, flight, and flight legs which supplies this information at the inquiry of any one of the remotely located ticket offices, and which automatically changes the stored information to conform to ticket sales performed at that office.

Access to the records is through the keyboard of the agent's set, and answers to requests are indicated by the illumination of appropriate lamps contained within the agent's set.

Figure 1:
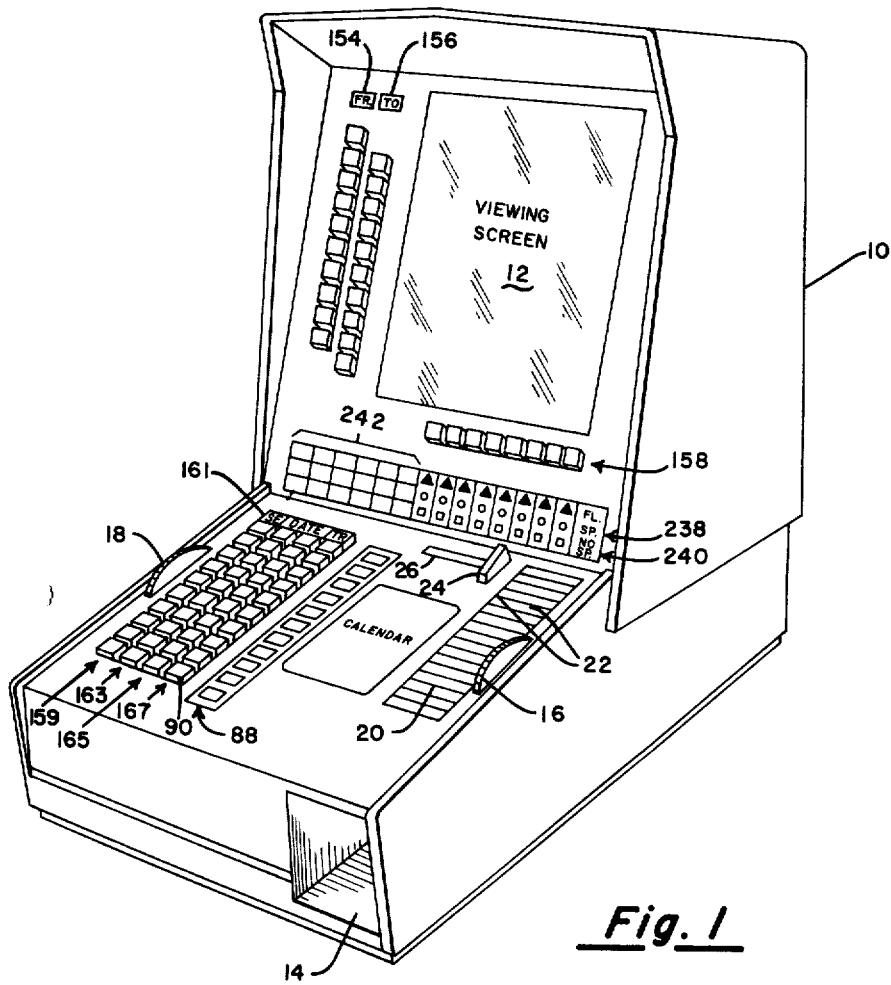
FIGURE 1 illustrates a projected view of an exemplary embodiment of this invention.

In FIGURE 1, the agent's set is shown as including a metal housing 10, a translucent viewing screen 12, an opening 14 for receiving a cartridge in which a plurality of light projectable fields such as film slides may be loaded, slide cartridge positioning knob 16 and similar knob 18 if desired, a slide designation viewing window 20, slide index indicator 22, a slide selecting lever 24 movable to the left and right in slot 26, and a plurality of switch operating means such as keys or buttons along with a plurality of windows backed by lights indicating replies from the computer system all of which will be referred to later.

Figure 2:
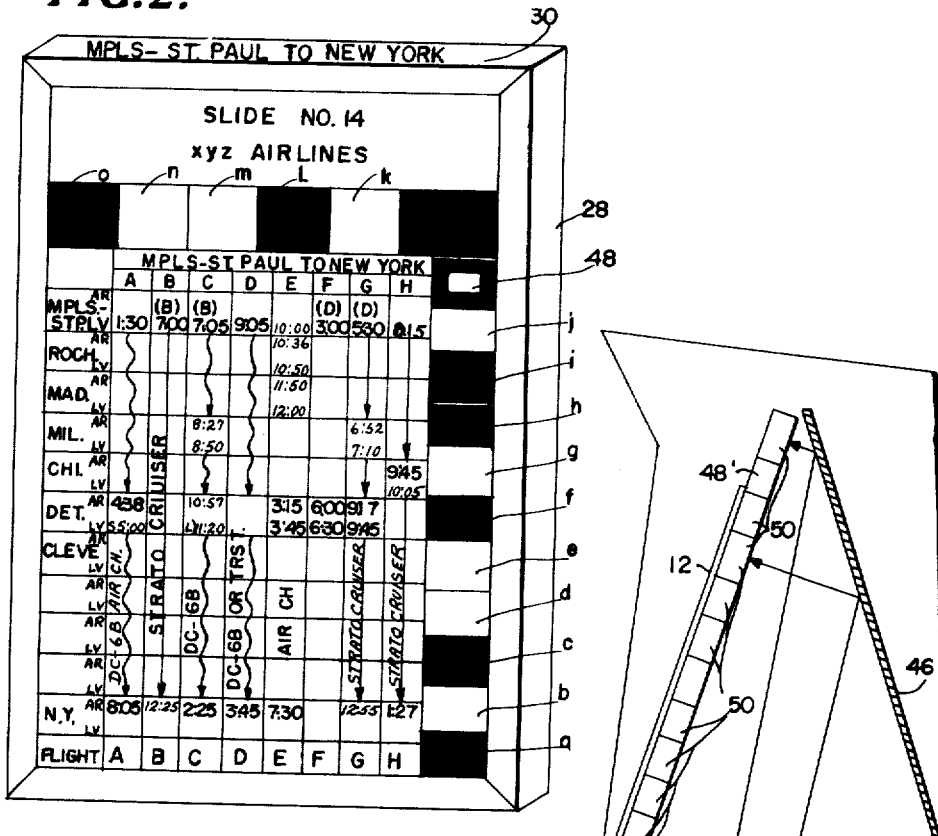
FIGURE 2 illustrates an exemplary photographic slide usable with this invention.

Different flight information is printed on each different light projectable field such as the central photographic slide illustrated in FIGURE 2. Each such slide has the standard 35 mm. double frame image, 24 mm. x 36 mm. mounted in a 2" x 2" metal mount 28. As may be noted along the top edge of frame 28, there is an index designation 30 printed thereon so as to be visible to an operator through the index viewing window 20 of FIGURE 1. The particular index designation 30 for the slide shown in FIGURE 2 is "Mpls & St. Paul to New York," as a representative example. Thirty different slides, such as the one shown in FIGURE 2, may be contained in the cartridge or magazine (not shown in FIGURE 1) which can be inserted in the opening 14 of FIGURE 1. Each different slide has a different index designation corresponding to the different complete flights which the particular airline using the system generally has in operation.

As shown in FIGURE 2, each slide may have 10 possible origins and destinations which means that 10 different flight legs or 55 different trip combinations are designated on the slide per flight. Also each slide may designate eight different flights respectively lettered A through H. It therefore becomes apparent that there may be 80 different flight legs and 440 different trip combinations for each slide, and with 30 slides per cartridge, for example, 2,400 different flight legs and over 13,000 different trips are represented by each cartridge. There is no limitation on the number of cartridges which may be used with an agent's set except the storage capacity of the central computer which is to be used with the overall data processing system and the particular slide coding system employed. As will be later apparent, the coding scheme herein suggested without limitation thereto would limit the total number of slides if same were set up as in FIGURE 2, to $16^3$ or 4096 slides. Space for storing information on over 329,680 flight legs involving over 1.8 million different possible trips, as would be necessary for 4096 slides, is easily obtainable with most computer systems. As will be apparent hereinafter, an agent's set constructed in accordance with this invention will provide information concerning any flight leg printed on any slide as long as the computer previously has such information stored.

The use of photographic slides provides great versatility and ease of duplication. Since the printed information thereon can be projected with an enlarged image, it can easily contain a large amount of information including, for example, not only the origins, destinations and flight numbers, but the arrival and departure times, type of equipment, meals, service notes, fares, etc. With the basic information of origins, destinations and flight numbers, which are effectively a portion of the conventional airline type timetables, an operator may make inquiries to the central computer about flights from any origin to any destination as long as the information is represented on a photographic slide.

As above mentioned, a plurality of different slides such as the one shown in FIGURE 2, are normally available for selecting ony one of a plurality of groups of slides for use in the agent's set of FIGURE 1. For holding a group of slides, a cartridge or magazine may be employed. Then, any one of the slides in the magazine may be selected for projection in the manner later described. One embodiment of slide positioning means is shown in FIGURES 3, 3A, and 3B. For this type of embodiment, each of the photographic films is disposed in a frame such as the one shown in FIGURE 3C. That is, the film 300 may be first disposed in a frame such as frame 28 of FIGURE 2, which frame is then surrounded by frame 302 of FIGURE 3C. Alternatively, a photographic film itself may be directly disposed in frame 302. As will be noted, frame 302 contains two notches 304 and 306. These notches are employed to allow movement of the slide into and out of cartridge 308. Each such cartridge contains a plurality of slides each separated by a partition such as web 310. All such webs are connected to the cartridge inwardly of the open end thereof as shown, or alternatively, the portion of each frame including notches 304 and 306 protrude from the cartridge. In either case, two hooks 312 moveable between the left and right positions shown therefor by slide selecting lever 24, are in notches 304, 306 of the different frames 302 progressively when lever 24 is to the right and the cartridge is moved inward and outward by rotation of knob 16. Movement of lever 24 in slot 318 causes the channel-shaped slide 320 to move to the right and left. At the right end of this slide are connected the two hooks 312. Therefore, when lever 24 is in its rightward position, the hooks extend into cartridge 308 as shown in FIGURE 3. However, upon moving the lever 24 to the left, a slide is withdrawn from the cartridge and positioned so that the film portion 300 of the slide is in register with aperture 322 in the side plate 324.

As lever 24 is moved rightwardly, the channel slide 320 attached thereto not only carries slide frame 302 back into the cartridge 308, but also moves cover plate 326 about its pivot pin 328 which fits in the two ears 329 formed at the left end sides of plate 326. This opens the space between plate 326 and the side member 324 so that slide frame 302 may be easily returned to the cartridge.

When lever 24 is to the left, the cover or plate 326 is urged against the withdrawn slide frame 302 by a spring 330 operative about pin 328. At the right end of plate 326, there is a triangular shaped ear 332 on each side of the plate. These ears, as shown in FIGURE 3, fit into a slot formed by the up turned sides 334 of plate 324 and the cut-away portion of the plate 324 as it extends toward its right end. In this manner, a slide frame withdrawn from the cartridge is properly positioned in the vertical direction relative to FIGURE 3A, while movement of lever 24 to its full left position causes proper horizontal registration of the film area of the slide with the aperture 322. Plate 326 also contains an aperture 336 which allows a full view of the film area of a withdrawn slide. Further attached to the cover plate 326 are two springs 338, one on each side of aperture 336. These springs extend through their own respective apertures in plate 326 so as to rest against the slide frame 302. Preferably, there is disposed in the frame of each slide two indentations, designated 340 in FIGURE 3C, in which the springs rest when proper registration of the slide is accomplished.

From the foregoing description relative to FIGURES 3, 3A, and 3B it is apparent that any given slide in any particular cartridge employed may be selected for use in the agent's set. The particular frame shown in FIGURE 3C for holding a slide or film, as well as the illustrated means for extracting and replacing a slide so formed, is not intended to be limitative of means for accomplishing these functions, since any other appropriate apparatus for moving the slide into and out of a cartridge may be employed.

Figure 4:
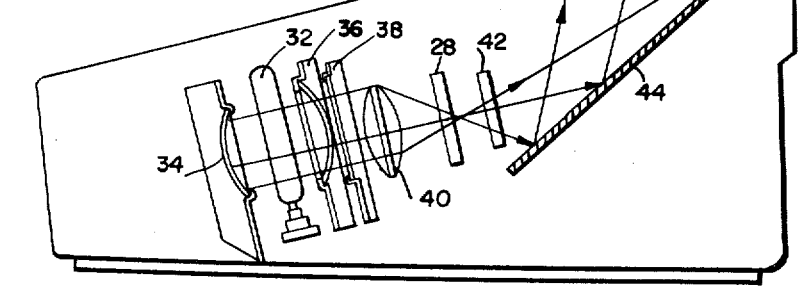
FIGURE 4 illustrates the optical system of an exemplary embodiment.

In order to enable an operator to view the printed information on a selected small photographic slide, an optical system is contained within the agent's set to project the timetable information onto the viewing screen 12 shown in FIGURE 1. An exemplary optical system for accomplishing this is shown in FIGURE 4. Once a particular slide is selected and positioned such as slide 28 in FIGURE 4, for projection of light therethrough, the light emanating from lamp 32 located at the focal point of mirror 34 is passed through condensing lens 36, heat filter 38, another condensing lens 40 through the slide and lens 42. The light then falls onto mirror 44 which reflects it to mirror 46, in turn reflecting the light to the viewing screen 12. The heat filter 38 prevents the heat energy radiated from lamp 32 from burning or otherwise damaging the photographic slide surface should the slide remain in the projected position for extended periods of time. A heat exhaust fan is preferably included in the agent's set to remove excessive heat. The projection lamp may be operated at a reduced voltage through a high reactance transformer (not shown) to prolong the life of the lamp.

In addition to the timetable information, each slide contains further predetermined information in the form of areas encoded either opaquely or transparently in accordance with a predetermined code. Reference to FIGURE 2 will show that there are 10 such areas designated $a$ through $j$ respectively along the right hand edge of the slide, and five other areas designated $k$ through $o$ respectively along the top of the timetable information. These different coded areas are projected by the optical system shown in FIGURE 4, as is the opaquely outlined transparent spot 48. This latter area or spot is always transparent and is used for indicating that the slide is in the correct position, as will be apparent hereinafter. For each of the coded areas $a$ through $o$ and for the transparent spot 48, there is disposed along the right side and top back edges of the viewing screen a light sensitive device such as those shown diagrammatically in FIGURE 4 by the different boxes 50. Preferably, each of the light sensitive devices is a photovaristor, and each respectively receives light from its associated area when such area is transparent, thereby making the corresponding photovaristors conductive. Of course, when light from lamp 32 strikes an opaque area on the coded portion of the slide, no light falls on the corresponding photovaristor, and it therefore remains non-conductive because of its then high resistant state.

Before proceeding with the electrical connections to the different photovaristors in the agent's set, reference will be made to FIGURE 5 to explain the overall system operation whereby any one of different agent sets may communicate with a central data processor. In FIGURE 5, the assumption is made that each one of the three different illustrated agent sets 52, 54, and 56 is located at a station considerably remote from a data storer and processor 58, commonly called and herein referred to as a computer, which may be similar to the one described and claimed in the copending application of J. G. Miles et al., Serial No. 255,967, now Patent No. 2,910,238 entitled "Inventory Digital Storage and Computation Apparatus." It is to be understood that there can be any number of remote stations as well as similar nearby stations connected to the central computer, but for purposes of simplicity, only one remote station with three agent sets will be described. Of course, more or less than three agent sets may be used at any one station. Each of the agent sets at a given station may be connected to a central program scanner 60. This scanner includes set selector apparatus 62 which operates to connect one and only one of the agent sets at a given time to the computer. The selector 62 may include a selector stepping switch and relays and is operative to connect a given agent's set upon the establishment of a line of continuity in the set. As will be later apparent, the depression of certain keys or buttons on an agent's set effects a line of continuity and indicates to the set selector 62 that that set is ready to be serviced. Upon subsequent stepping of the set selector to an agent's set so readied, communication between that set and the computer is established. Relative to the agent's set 52, there is shown line 64 which is the line on which continuity to ground potential for example, may be established by depression of certain keys on the agent's set. When continuity is established, lines 66 are connected to lines 68 respectively via the set selector 62. By means of stepping switch 70, each of the lines 66 is then sequentially energized from a source of voltage connected to the arm 72 of the stepping switch 700. As will be later apparent, the sequential energization of lines 66 effects sequential groups of electrical signals on output line 74 from the agent's set 52. This output line is connected via the set selector 62 to line 76 which in turn is connected to an error checking circuit 78. Preferably circuit 78 is a parity and character type checking system and is operative to maintain the errors in the system at an extremely low level. If an agent has made an incorrect request, this error will be noted in the error checker 78, and a signal will issue on line 80 to the decoder light holding circuits 82. Under such circumstances, no decoding takes place, but the signal on line 80 actuates relays or the like in circuit 82 to cause a signal to be sent out on line 84, through set selector 62 to an input line 86 of the agent's set 52. This will cause a "repeat request" or "reset" light in the column of lights 88 (FIGURE 1) on the agent's set to be lighted. The operator will then depress a "clear" buttton 90. When the operator has depressed the proper keys on the agent's set so as to cause no error detection, a signal will issue on line 92 (FIGURE 5) from the error checking circuit. Line 92 is connected to a standard commercial telephone or telegraph type terminal 94 located near the remote station. For purposes of control, particularly relative to other remote stations, line 96 is also connected to terminal 94. The control signal on line 96 is one which is effected by the establishment of ground continuity on line 64 from any one of different agent's sets connected to the program scanner 60. The control signal and sequential groups of electrical signals on line 92 are transferred from terminal 94 by commercial telegraph or telephone type lines as line 98 to a corresponding terminal 100 located nearer the central computer 58. The output of terminal 100 includes a control signal on line 102 which corresponds to the control signal on line 96, and coded groups of electrical signals on line 104. Computer 58 quickly operates and sends back a reply in the form of coded groups of electrical signals on line 106 along with a control signal on line 102. This reply is relayed back via the telegraph channels to program scanner 60 and in particular to the error checker 78 over line 108. If the checker finds that an error has been made, an error signal is again transferred to the agent's set in the manner previously explained. However, if there is no error, the different groups of signals on line 108 are decoded and actuate relays or the like in circuit 82 to effect lighting of appropriate reply lamps in the agent's set 52. At the end of a reply, the computer control signal is sent over line 102 to line 96 to indicate to the set selector that the reply is complete. The set selector thereupon continues scanning the different agent's sets until another set is found to have ground continuity on its line 64. Further operation of the system will become more apparent with the later description of the circuitry of an individual agent's set.

Each of the photovaristors 50 of FIGURE 4 are shown respectively in FIGURE 6 as variable resistors 50–$a$ through 50–$o$, while the photovaristor 48' which corresponds to the correct positioning transparent spot 48 in the photographic slide in FIGURE 2, is also indicated in FIGURE 6 at 48'. Each of the photovaristors is electrically connected at one end to a coil of a relay. For example, photovaristor 48' is connected to relay coil 110, photovaristor 50–$a$ to relay coil 112, 50–$b$ to coil 114, 50–$c$ to 116, etc., and photovaristor 50–$o$ to relay coil 140. At the other end of each of the photovaristors, there is a connection through the respective resistors 142 which are commonly coupled to terminal 144. The latter is permanently connected to a source of voltage +V. The resistors 142 provide a threshold value of resistance so as to adjust the voltage source +V to the several relay coils. When a photovaristor is actuated upon the receipt of light, its resistance is therefore low, and the respective resistor 142 limits the current through the associated relay coil to prevent damage thereto. Resistors 142 are also large enough in value so as to insure that the respective relay contacts 110$a$, 112$a$, 114$a$, etc., remain open when the respective photovaristor is not illuminated.

In the apparatus of htis exemplary embodiment 15 photovaristors are used to detect the information encoded on any given slide. These are the photovaristors indicated in FIGURE 6 by the number 50 followed by a letter. In addition, one photovaristor 48' is used to index the slide, i.e., to detect whether or not the slide is positioned correctly in the projection system. That is, when the slide is correctly positioned, light passes through the transparent spot 48 of the slide in FIGURE 2 and illuminates photovaristor 48'. It may be noted that the transparent spot 48 is much smaller than any of the other transparent code areas such as area $j$ for example, and this insures highly accurate positioning of a slide before use thereof. This energizes relay coil 110 and closes contacts 110a which are connected at one side to line 64, the line previously referred to in relation to FIGURE 5 as the ground continuity line. At the other side of contacts 110a, there is connected a line 146 which, as will be later seen, is connected to ground upon the depression of certain keys on the agent's set.

When ground continuity is thereby established, and relay coil 110 is energized so as to close its contacts 110a, sequential energization is applied by stepping switch 70 (FIGURE 5) via three of the lines in group 66 thereof to terminals 148, 150 and 152 (FIGURE 6) preferably in that order. It will be noted that the different relay contacts are divided into three groups of 5, with each contact being connected at its upper end through a diode 153 to one of the terminals 148, 150 or 152. At the other side of each of the contacts, there is connected a line which is further connected to one of the five output lines A, B, C, D, or E. Each contact in each group of five contacts is connected to a different line of lines A, B, C, D, E, but is connected to the same line of terminals 148, 150 and 152. In this manner, there is provided a binary coded, five level signal on lines A, B, C, D and E upon the energization of each of terminals 148, 150 and 152. That is, and in keeping with the example set forth in the particular coding shown for the slide in FIGURE 2, photovaristors 50–b, 50–d, 50–e, 50–g, 50–j, 50–k, 50–m and 50–n will be illuminated and consequently in their low resistivity state. The associated relay coils will then be actuated so as to close their respective contacts. With contacts 114a, 118a, 120a, 124a, 130a, 132a, 136a and 138a being so closed, the five-level binary signal on lines A, B, C, D, and E in that order, when terminal 148 is energized, is 01011. In like manner, when terminal 150 is energized, the output on lines A, B, C, D, E, is 01001, and when terminal 152 is energized, the output is 10110.

A preferred alternative to the many different possible switching systems for causing appropriate code signals on lines A–E in response to impedance variations in the photovaristors is shown in a partial schematic modification in FIGURE 6A. Each of the photovaristors is connected to a different transistor at its base to cause the transistor to be conductive or not in accordance with the impedance of the associated photovaristor. For example, photovaristor 50–j with a positive potential of say 10 volts at one end is connected at its other end to the base of transistor 155 and photovaristor 50–i is similarly connected to the base of transistor 157. The bases of the transistors are further coupled respectively to a negative potential, for example −25 volts, by resistors 159. The emitter electrodes are coupled to the common input terminal 150 which in this case moves from a normal −10 volt potential to 0 volts for example, during a scan, while the collector electrodes are coupled respectively by diodes 153' to the associated output lines E and D for example. All the output lines A–E are coupled, as shown by lines E and D to a negative potential, for example of 10 volts, by respective resistors 161. When photovaristor 50–j is in its high resistivity state, the base of transistor 155 is biased negative making the transistor conductive but no conduction occurs until terminal 150 moves to 0 volts causing output line E to move up to 0 volts indicating a 1 output. However, when photovaristor 50–j is illuminated, its low resistivity makes the base of transistor 155 more positive and the transistor becomes non-conductive. Therefore upon receipt by terminal 150 of a positive going signal, the voltage on line E cannot change from −10 volts, thereby indicating a 0 output. It may be noted that the arbitrary indication of 1 and 0 outputs in this embodiment is reversed from that of FIGURE 6 relative to light and no light on a photovaristor.

Collectively, output lines A, B, C, D and E are designated as line 74 which was previously referred to in relation to FIGURE 5 as sequentially carrying the output signals from the agent's set. The three five-level groups of binary coded electrical signals are relayed to the computer in the manner previously explained, and are effective to identify a program for the computer to follow as well as the address of previously stored information concerning the slide associated with the identified program. Each of the three groups of electrical signals may be one of 16 different identification codes expressed in binary coded "excess-three" modulo 16, with parity. This is an arbitrary code identification scheme, but with the use of such a code, it is possible to employ $14^3$ or 2744 different slides and still retain the self-checking features while using the remaining codes for other desirable purposes. With this number of different slides available and assuming each silde has at least a potential of 80 different flight leg designations, as previously explained, over 200,000 different flight legs involving information on over 1.2 million different possible trips may be provided by the usable slides.

The information which is to be processed in accordance with the program identified by a given slide, is entered into the system by depression of different keys or buttons on the upper and lower panels of the agent's set shown in FIGURE 1. On the left hand side of viewing screen 12, there are located two columns of unlabeled buttons, the leftmost column has ten buttons and is headed by a small rectangle 154 marked "From." The column of buttons adjacent thereto also contains ten buttons which are headed by a small rectangle 156 marked "To." When the slide of FIGURE 2 is projected on screen 12, each of the From and To buttons is horizontally aligned with one of the origin and destination cities on the slide. To select a flight leg, the adjacent From button is depressed, as is the adjacent To button.

In like manner, there are located eight flight number buttons 158 along the bottom of viewing screen 12. These buttons correspond respectively to the different flights A through H indicated on the slide of FIGURE 2. When information concerning a given one of these flights is sought, the appropriate button is depressed. On the left portion of the lower panel of the agent's set, there are still other buttons which may be depressed to obtain information. Column 159 of buttons is headed by a small rectangle 161 marked "Seats" and the first four buttons thereunder are respectively marked "1," "2," "3" and "4." The remaining six buttons in the column reading downwardly are "Jan," "Feb," "Mar," "Apr," "May," "Jun." Columns 163 and 165 are headed with a rectangle marked "Date." The first four buttons in column 163 correspond to the tens digit date and are marked "0," "1," "2," "3," while the six buttons reading downwardly are marked "Jul" through "Dec" respectively. The buttons in column 165 are designated "0" through "9" respectively and correspond to the units digit date. Column 167 is the transaction column and is headed by a small rectangle marked "Trans." The different types of transactions which may be handled by an agent's set is then marked on the different buttons in the column. As examples of the transactions which are employed in an exemplary manner for descriptive purposes, the topmost transaction button is marked "Ask," while the second through seventh buttons are respectively marked "Sell," "Wait List," "Cancel," "Cancel Wait List," "Arrival," and "Departure." Generally, the eighth and ninth buttons are unused, while button 90 previously referred to is the button which may be used not only to clear any lights representing reply information but also to clear or release any depressed transaction button. Release of other depressed push buttons on the set is preferably accomplished by the slide positioning means upon returning a slide to its cartridge by lever 24.

Each of the different buttons or keys on the agent's set has associated therewith switch means which comprises at least two independent single-pole single-throw switches which are operated upon depression of the respective buttons.

Figure 7:
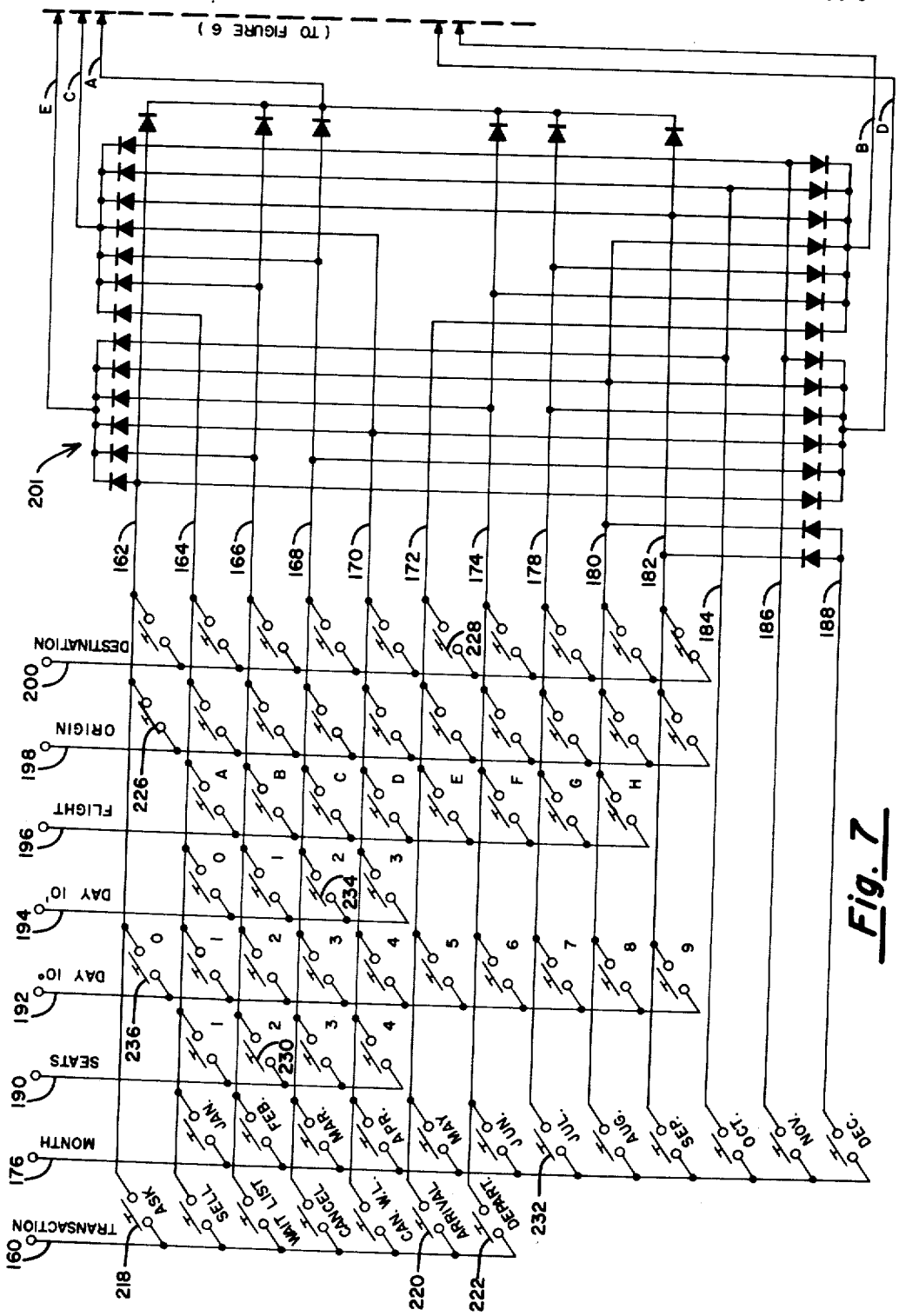

FIGURE 7 shows the interconnection of one of the switches from each of the different switch means associated with each of the different buttons of the agent's set. Each of the switches is connected between one vertical line and one horizontal line so as to establish connection therebetween when the corresponding button is depressed. However, each switch is not connected to the same vertical and horizontal lines in FIGURE 7, but instead, each group of switches is connected to a different vertical line while one switch in each of the groups is connected to a different one of the horizontal lines. That is, each of the transaction switches are connected at one side in common to line 160, while the other sides of the transaction switches are connected respectively to the horizontal output lines 162, 164, 166, 168, 170, 172 and 174. In a similar manner, each of the month designating switches are connected at one side in common to the vertical line 176 and are connected at their other sides respectively to output lines 164, 166, 168, 170, 172, 174, 178, 180, 182, 184, 186 and 188. Each of the different seat designating switches are connected in common at one side to the vertical line 190, and respectively to one of the output lines 164, 166, 168 and 170. In like manner, all of the day units designating switches are connected in common to line 192 and to a different one of the output lines. Line 194 connects to each of the tens day indicating switches, while lines 196, 198 and 200 connect respectively in common to each of the flight indicating switches, origin indicating switches and destination indicating switches. The output lines 162–188 connect respectively to input lines of the translator or coding means 201. The coder has five output lines, A, B, C, D, and E which are connected respectively to the like designated lines in FIGURE 6. Between the input and output lines of coder 201, there are five banks of diodes with each diode in a given bank being connected at one end to one of the output lines A through E. To effect the coding, the input lines to the coder 201 are connected in a predetermined manner to a given one or ones of the different diodes of the several banks thereof. The particular connections shown will effect "excess-three" code with parity. This is an arbitrary coding system, and it is to be understood that any other desired code may be employed.

Each of the lines 160, 176, 190, 192, 194, 196, 198 and 200 in FIGURE 7 correspond respectively, along with the lines connected to terminals 148, 150 and 152 in FIGURE 6, to one of the lines collectively designated 66 in FIGURE 5. Therefore, when ground continuity is established via line 64, each of the input lines of FIGURE 7 are also sequentially energized by stepping switch 70 of FIGURE 5. Consequently, the switches of FIGURE 7 which are closed by depression of the corresponding button on the agent's set, effect a signal to the corresponding input line of coder 201. The coder then translates this signal into a five-level binary encoded signal and transfers same to the output lines A, B, C, D and E of FIGURE 6 and thence to the program scanner 60 of FIGURE 5 when same is electrically connected thereto. The diodes in the coding matrix of FIGURE 7 are employed to prevent unwanted outputs from appearing on lines A through E when any one of the coder input lines has a signal appearing thereon. For example, when a signal is applied over input line 162, it is evident by the connections thereto that the output on lines A, B, C, D, and E should be 10011. If the diodes were not present, the "1" signals would feedback through all of the lines connected to the respective output lines so as to appear as a "1" on each of output lines A through E.

For a better understanding of the operation of the circuitry of FIGURE 7, reference may be made to Table I.

*Table I*

| Transaction | Month | Seats | Day | | Flight number | Origin or destination | Coder input line | Code on output lines | | | | |
|---|---|---|---|---|---|---|---|---|---|---|---|---|
| | | | Units | Tens | | | | A | B | C | D | E |
| Ask | | | 0 | | | Mpls.-St. Paul | 162 | 1 | 0 | 0 | 1 | 1 |
| Sell | Jan | 1 | 1 | 0 | A | Rochester | 164 | 0 | 0 | 1 | 0 | 0 |
| Wait list | Feb | 2 | 2 | 1 | B | Madison | 166 | 1 | 0 | 1 | 0 | 1 |
| Cancel | Mar | 3 | 3 | 2 | C | Milwaukee | 168 | 10 | 1 | 1 | 0 | - |
| Cancel wait list | Apr | 4 | 4 | 3 | D | Chicago | 170 | 0 | 0 | 1 | 1 | 1 |
| Arrival | May | | 5 | | E | Detroit | 172 | 0 | 1 | 0 | 0 | 0 |
| Departure | Jun | | 6 | | F | Cleveland | 174 | 1 | 1 | 0 | 0 | 1 |
| | Jul | | 7 | | G | | 178 | 1 | 1 | 0 | 1 | 0 |
| | Aug | | 8 | | H | | 180 | 0 | 1 | 0 | 1 | 1 |
| | Sep | | 9 | | | | 182 | 1 | 1 | 1 | 0 | 0 |
| | Oct | | | | | New York | 184 | 0 | 1 | 1 | 0 | 1 |
| | Nov | | | | | | 186 | 0 | 1 | 1 | 1 | 0 |
| | Dec | | | | | | 188 | 1 | 1 | 1 | 1 | 1 |

When each of the switches corresponding to the different designations is depressed, a given code is effected on output lines A through E. It may be noted that the same group of output signals on lines A through E is effected whether the "Ask" switch, "0" units switch, or "Mpls-St. Paul" switch is depressed. Similarly, the code signal 00100 is produced regardless of whether the "Sell," "Jan," "1" seat, "1" units, "0" tens, "A" flight number, or "Rochester" origin or destination switches are depressed. However, since each of the input lines in FIGURE 7 are energized sequentially, there is no mixture of the different groups of signals on output lines A, B, C, D, and E. The sequence of energization of the different input lines in FIGURE 7 and of the different input lines connected to terminals 148, 150 and 152 in FIGURE 6 is always the same as predetermined by stepping switch 70 in FIGURE 5, and the computer is arranged to recognize the particular code group in accordance with its sequential arrival at the computer. For example, the arrival at the computer of code group 10011 will indicate because of its sequence, "Ask" at one time, but will indicate "0" as the units digit of a date at another time, and at still another time will indicate "Mpls-St. Paul" as an origin. The sequencing of the different lines by the stepping switch 70 in FIGURE 5 is rather arbitrary as long as the computer is properly set up to recognize a predetermined sequence of code groups. A preferable sequence will be later given relative to a representative exemplary operation of an agent's set.

As before indicated, each of the representative buttons on the upper and lower panels of the agent's set in FIGURE 1, has at least one switch in addition to that shown in FIGURE 7. For example, each of the switches shown in FIGURE 8 is associated with one of the switches of FIGURE 7 as well as with one of the different buttons illustrated in FIGURE 1. For each of the different groups of switches of FIGURE 7, there is at least one other switch associated therewith and operable by the associated push button. The second switches associated with the transaction type switches of FIGURE 7 are connected together in parallel as shown in FIGURE 8 for example by column 202. Serially connected to this group of switches is another parallel group of switches in column 204, and these switches are the second switches which correspond respectively to the seats type switches of FIGURE 7. All of the second switches for the origin column of switch buttons are connected in parallel as shown in column 206, while all of the second switches for the month group of switches are connected in parallel as shown in column 208. Likewise, the tens day switches are connected in a parallel column 210 and the second switches for the units day are connected in a parallel column 212. Similarly, all of the second switches for the destination buttons are connected in parallel, as are all of the second switches for the flight destination buttons as shown in columns 214 and 216 respectively.

As illustrated in FIGURE 8, each of these columns of parallel connected switches are connected in series and when one switch in each of these columns is closed, line 146 is connected to ground to establish a line of continuity. In addition to second switches, the push buttons associated with the transactions "Ask," "Arrive" and "Depart," have a third switch associated therewith. These are for purposes that will later become more apparent. Upon depression of the Ask push button, not only do Ask switch contacts 218 of FIGURE 7 close, but also do the Ask switch contacts 218', and the Ask switch contacts 218". As will be noted in FIGURE 8 switch contacts 218" bridge the Flight switches located in column 216. In like manner, the Arrival and Departure switches 220 and 222 of FIGURE 6 have associated respectively therewith not only the second switches 220' and 222' shown in the switch column 202 of FIGURE 8 but also a third switch 220" and 222" respectively. The third Arrival switch 220" bridges the month and day columns of parallel connected second switches, while the third Depart switch 222 bridges the month, day and destination columns. For reasons which will be more apparent hereinafter, the switches of column 206 are bridged by a direct line 224 thereacross. Therefore, it can be seen that once a transaction type push button and a seat type push button are depressed, ground continuity can be established on line 146 if one or more of the other switches in the different columns is actuated by its corresponding push button. As previously explained, establishment of ground continuity on line 146 is operative to effect sequential operation of the stepping switch 70 of FIGURE 4 as long as the photovaristor 48' in FIGURE 5 is illuminated so as to close relay contacts 110a. Therefore, it is apparent that all the keys are electrically interlocked so that the proper number of push buttons required for a given type of transaction must be depressed before any data can be transmitted to the computer. This fact, plus the fact that each computer input and output word is subjected to a parity check and a character count check, makes the aforesaid set essentially error free.

For illustrative purposes, suppose information as to the availability of two seats from St. Paul to Detroit on May 20 is requested. The agent first selects a proper timetable, say that of FIGURE 2, by positioning the index designation 30 under the slide indicator pointers 22 (FIGURE 1) using either one of the slide positioning knobs 16, 18. When the desired slide is under the indicators 22, the agent moves the slide entry lever 24 to the left which in turn withdraws the slide from the slide cartridge, positions it properly in the projection system, and causes the projection lamp to light. As previously indicated, the slide entry lever may also act as an interlock which prevents the slide cartridge from being moved until the slide being projected is returned to the cartridge.

Illumination of the lamp projects the printed information onto the viewing screen 12, and also activates the different photovaristors in accordance with the encoded areas around the upper and right edges of the slide. As previously indicated, the slide of FIGURE 2 will effect the code groups 01011, 01001, and 10110 on lines A through E of FIGURE 6 respectively when lines 148, 150 and 152 are sequentially energized. These lines are not energized, however, until the scanner of FIGURE 5 is electrically connected to the agent's set upon the establishment of ground continuity on line 146. That is, because of the arrangement of the circuitry shown in FIGURE 8, a complete entry for a given transaction must be keyed into the set before the scanning mechanism can couple an agent's set to the central computer.

There is no particular sequence in which an operator must depress the different keys or push buttons on a set, except that he should always depress either the transaction type push button or the seat number push button last. Regardless of the sequence which the operator uses in depressing the different push buttons, the computer will always receive the coded information in a given sequence because of the way stepping switch 70 of FIGURE 5 is connected to the different agent sets. Consequently, an agent may next depress the origin key. Since the origin of the flight leg which is involved in the above mentioned example, is St. Paul, the agent will depress the first push button in the "From" column 154 in FIGURE 1. The depression of this push button will close switch 226 in FIGURE 7 as shown, as well as switch 226' in FIGURE 8. Actually, when the origin or destination corresponds to the location of the agent's set, there is no need to depress the corresponding push button since the switches therefor are normally closed switches and operate to effect signals regardless of whether the push buttons are depressed. That is, switch 226 in FIGURE 7 may be normally closed and is unoperative by its corresponding push button, but may be open by the depression of any other push button in the origin or "From" column by mechanical means well known in the art. With switch 226 closed, the subsequent energization of line 198 energizes line 162 which via coder 201 effects a binary signal on output lines A through E of FIGURE 7 (and also in FIGURE 6) in the form of 10011, as indicated in Table I above.

Similarly, when the agent presses the key in the destination or "To" column 156 of FIGURE 1, which key is laterally disposed from the Detroit entry shown on the screen, switch contacts 228 (FIGURE 7) and 228' (FIGURE 8) are closed. Energization on the destination input line 200, will then effect a signal on line 172, which in turn will cause an output on lines A, B, C, D and E of 01000 in accordance with Table I.

In a similar fashion, the agent depresses the appropriate Seats push button in column 163 of FIGURE 1. Since the example set forth above specifies that information relative to two seats is being sought, switch contacts 230 (FIGURE 7) and 230' (FIGURE 8) are closed. It should be understood, that information as to the availability of 1, 2, 3 or 4 seats can actually be requested during one transaction. With the embodiment shown, a request for more than four seats, requires two or more transactions to be made by the operator. However, in a different embodiment more than the four Seat push buttons and switches may be utilized. With switch 230 closed, energization on line 190 will effect an electrical signal on output line 166. The binary code then formed on lines A through E is 10101.

The operator may then depress the Jul month key so as to close switch 232 in FIGURE 7 and 232' of FIGURE 8. Subsequent energization on line 176 of FIGURE 7 effects an electrical signal on output line 178 through the closed switch contacts 232. The output from the coder 201 is in this case 11010. It is to be noted that had the month key been Aug. instead of Jul. this code group would have been the same as the code group established on lines A through E by the sequential energization of line 148 in FIGURE 6. However, such would make no difference since lines 148 and 176 are energized at different times, and in a predetermined order, so the computer will recognize that in one instance the code group pertains to program directions, while at another time, the same code group is specifying the month of August.

Next the operator may depress the key corresponding to the "tens" digit of the date for which information is requested. Since the date is the 20th, the "2" push button in the tens digit date column is depressed. This effects closure of switch 234 in FIGURE 7 and switch 234' in FIGURE 8. When sequential energization connects to line 194, a signal is caused on line 168 which in turn effects the code group 10110. Had the date been the 10th, the code group for the tens digit would have been the same as that for the number of seats, but because of their different sequence, would have different meanings to the computer.

The agent may then select the "units" digit of the desired date. Depressing the key marked "0" causes switch contacts 236 in FIGURE 7 and 236' in FIGURE 8 to close. Sequential energization of line 192 will then cause a signal on line 162 and effect a code group of 10011. Again, because of the different order in which this code group is received as compared to the order in which the same code group is received to designate an origin of St. Paul, the computer will distinguish between the two meanings of this code group.

Finally, the agent may depress a key corresponding to the nature of the transaction desired. In the example set forth, the inquiry is whether two seats would be available at such and such a time. Therefore, the Ask push button is depressed so as to close switch 218 in FIGURE 7 and switches 218' and 218" in FIGURE 8. Subsequent energization then of line 160, causes an electrical signal on line 162 in FIGURE 7. Again, the output code group is 10011, but this time it will be interpreted by the computer to reflect an Ask transaction.

The switches in FIGURE 8 which have been closed by depression of the push buttons in the foregoing example, are shown as having a diagonal bar passing through them. It can be seen that ground continuity is provided in FIGURE 8 by the particular closed switches. Consequently, if the slide is correctly positioned so that relay contacts 110a of FIGURE 6 are closed, an electrically continuous path is established between ground at the agent's set and the program scanner 60 of FIGURE 5, thereby initiating the scanning cycle. The scanner mechanism couples the agent's set to the telegraph equipment, as previously described, and sends the code groups serially to the central computer.

If the particular information sought had been relative to a given flight, one of the flight push buttons 158 (FIGURE 1) would have been depressed. In this manner, an immediate answer from the computer relative to whether the two seats were available on that flight would be obtained.

As a representative example of preferable sequencing of data to the computer, reference is made to the following table.

*Table II*

| Sequence to computer | Line energized | Code |
|---|---|---|
| 1st, Transaction | 160 | 1 0 0 1 1 |
| 2nd, Slide identification | 148 | 0 1 0 1 1 |
| 3rd, Slide identification | 150 | 0 1 0 0 1 |
| 4th, Slide identification | 152 | 1 0 1 1 0 |
| 5th, Destination | 200 | 0 1 0 0 0 |
| 6th, Seats | 190 | 1 0 1 0 1 |
| 7th, Month | 176 | 1 1 0 1 0 |
| 8th, Tens day | 194 | 1 0 1 1 0 |
| 9th, Units day | 192 | 1 0 0 1 1 |
| 10th, Origin | 198 | 1 0 0 1 1 |
| 11th, Flight number | 200 | 1 0 1 1 0 |

The above table indicates not only the sequence in which the different code groups are sent to the computer by the stepping switch 70 of FIGURE 5 by the sequential energization of the lines in the order listed in Table II, but also the code groups sent thereto by an inquiry such as that set forth in the representative example, assuming flight number C is the one in which a customer is interested. If the inquiry is to be made without any particular flight in find, the code group sent for the 11th position of the stepping switch may be 01000, for example.

In like manner, if information is desired merely as to the departure or arrival time of a given flight, information relative to the month and date is not essential, since the computer will recognize that it is the current date for which the information is sought. Reference to FIGURE 8 will show that for a particular flight, information may be obtained as to its departure time merely by depressing the Departure push button, which closes the respective transaction switch 222' along with its associated switch 222", and any one of the Seat buttons whereby ground continuity for line 146 is established. To obtain the arrival time for a given flight, there needs to be depressed not only the Arrival push button, but also a Destination push button, besides the appropriate Flight push button, and any one of the Seat push buttons.

After receiving the code groups serially, computation is provided, and the computer responds with information corresponding to the particular inquiry by serially forwarding groups of electrical signals back to the program scanner 60 of FIGURE 5. The different code groups are then decoded in decoder 82 and actuate light holding circuits for lighting appropriate lamps behind the different transparent window designators on the front of the agent's set. The reply information relating to space availability is in one of three categories, and if space is available one of the lights in row 238 in FIGURE 1 will be lighted. On the other hand, if no space is available, the appropriate one of the lights in row 240 will be lighted. When both lights in rows 238, 240 for a particular flight are lighted, the reply is indicative that a waiting list has been established. For flight status inquiries, there may be eight different categories corresponding respectively to "Special," "Cancelled," "Early," "On Time," "15 Min Late," "30 Min Late," "1 Hour Late," "2 Hours Late," which are respectively indicated by the different lights in area 242. In this same area, the reason for a canceled or late flight may also be given in the form of "Weather," "Equipment Failure," "Servicing," "Air Traffic Control" or "Wait List," for example.

To continue with the example set forth above, if two seats are available on the date specified, no particular flight having been specified, a space lamp will be lighted. The customer then chooses the particular flight, for example flight C, and the agent then depresses the corresponding push button in row 158 thereof. The depression of this push button, however, does not immediately cause a code group to be sent to the computer since at the end of the computer's reply, the program scanner continues to step to another agent's set. Upon returning to our agent's set, the ground continuity line is again sensed and full connection to the set is again made. The full sequence shown in Table II is again transmitted to the computer, but this time with a flight indication. If space is available on flight C, the "space" lamp directly beneath the push button corresponding to flight C is lighted. If no space is available on flight C, the "no space" lamp below the flight C push button becomes illuminated and another flight selection must be made if desired. If both the "space" and "no space" lamps are illuminated, the agent may place the customer on a waiting list, established in the event of cancellation by other customers, by depressing the "Wait List" transaction button in column 167.

If space is available on flight C, the agent may then depress the "Sell" transaction push button. Upon subsequent connection of the agent's set to the computer, the full sequence of Table II is again sent to the computer, but instead of the Ask code group 10011, the Sell code group 00100 is transmitted. Upon receipt of all of the signals, the computer selects two seats from the file maintained in the storage section of the data processing system and also dispatches a pulse train back to the program scanner. The scanner decodes this pulse train and actuates the appropriate holding circuit for the Sold lamp to indicate to the agent that the transaction is completed.

From the foregoing, it is apparent that an airline ticket agent may secure information from the memory of the electronic computer about flights from any origin to any destination as long as there is printed information indicating the origin and flights represented in timetable form on a photographic slide as projected on the screen. That is, the agent may obtain information concerning the availability of space of all the flights listed on the slide, and in special cases, may limit this to a particular flight without re-entering information into the set. Alternatively, he may sell or cancel available space without having made an inquiry. The agent may also request flight status information as to any flight leg for flights already in the air at the time of the inquiry. Further, each slide may contain information not normally considered flight information. For example, for one or more different flights, the slide may indicate that a steak dinner may be reserved. Then, with such an indication, or even when no such indication is given but it is known that steak dinners can be available by request, depression of an added push button, located for example adjacent the screen, along with a particular flight button could reserve a steak dinner for the customer. Alternatively, one "steak" push button for each different flight could be added. However, even without adding any new push buttons, an operator may reserve a steak dinner for a customer or relay any other type of desirable information particularly when such is noted on a slide. For example, considering the slide of FIGURE 2 as a matrix, any square thereon may be selected by depression of a button in row 158 (FIGURE 1) plus a button in one of the columns on the left of the screen, and if the square selected thereby does not denote an origin or destination but does denote "steak dinner," for example, a reservation therefor may be accomplished.

As previously indicated, the exemplary illustration of this invention has been made relative to an airline ticket agent's set. However, other applications and modifications of this invention will become apparent to those of ordinary skill in the art after reading this disclosure.

It is apparent that there is provided by this invention, systems and apparatus in which the various objects and advantages herein set forth are successfully achieved. The matter contained in the foregoing description and the accompanying drawings is to be interpreted as illustrative and not limitative, the scope of the invention being defined in the appended claims.

What is claimed is:

1. An input device for use in a data processing system comprising at least one light projectable field having predetermined information thereon including at least coded information in the form of a plurality of areas encoded opaque or transparent in accordance with a predetermined code, means for projecting said coded information, a first plurality of switch means, a plurality of light sensitive devices respectively coupled to said switching means for receiving the projected coded information and actuating the respective switch means upon receipt of light via an associated encoded area, said switch means and light sensitive devices being divided into a plurality of groups thereof, a plurality of output lines, each of said switch means of each group thereof being connected to a different one of said output lines, and means for sequentially and individually energizing each of said groups in accordance with a predetermined order, energization of any one group causing a signal or no signal on each one of said output lines in accordance with whether the connected switch means is actuated or not.

2. An input device as in claim 1 wherein each of said switch means includes a relay the coil of which is coupled to the respective light sensitive device and the switch contacts of which are coupled between the sequential energizing means and one of said output lines.

3. An input-output device as in claim 1 wherein said light projectable field also has printed information thereon and the projecting means projects said printed information, and further including screen means for receiving the projected printed information and visually displaying same, a second plurality of switch means each associated with an area of said screen means and consequently with a corresponding area of the projected printed information, a third plurality of switch means for accomplishing any one of a plurality of operations in a predetermined manner upon operation of given ones of the switch means in said second and third pluralities thereof, said sequential energizing means being coupled to sequentially energize each of the operated switch means, coding means coupling at least the operated switch means to said plurality of output lines for simultaneously causing on each of said output lines a signal or no signal for each sequentially energized and operated switch means in accordance with a code predetermined by said coding means.

4. An input-output device as in claim 3 wherein each switch means of said second and third pluralities thereof includes two switches one of which is coupled to said coding means and the remaining switches being interconnected in a given series and parallel relationship so as to provide a line of continuity only when a predetermined number of such switches is operated, said light projectable field having one additional transparent area, the outlining of which is opaque, one additional light sensitive device and an additional switch means coupled thereto, said additional light sensitive device being operative to actuate said last mentioned switch means only when light is projected by said projecting means through the opaque lined transparent area onto said additional light sensitive device, said additional switch means being connected with said continuity line, and means coupled with said last mentioned switch means for starting the sequential operation of said sequential energizing means when said last mentioned switch means is actuated and the line of continuity is established.

5. An input-output device as in claim 1 wherein said light projectable field also includes printed information in the form of a timetable and said projecting means projects said timetable, screen means for receiving the projected timetable and visually displaying same, said timetable having at least one origin and destination designation printed thereon along with a plurality of differently timed trips between said origin and destination designations, each trip being differently designated in a predetermined manner, second switch means associated with said origin designation, third switch means associated with said destination designation, a plurality of fourth switch means associated respectively with the different trip designations, a plurality of fifth switch means each corresponding to a different type of transaction concerning the timetable information, a plurality of sixth switch means corresponding respectively to the number of seats if any involved in a transaction, a plurality of seventh switch means for designating a date relative to a given transaction, said sequential energizing means being coupled to each of said switch means for sequentially energizing the second and third switch means and the operated ones of the switch means in each of said pluralities thereof, coding means coupling each of said switch means to said output lines for simultaneously establishing a signal or no signal on said output lines for each of the operated switch means in accordance with a code predetermined by said coding means.

6. An input-output device as in claim 5 wherein each of said second, third, fourth, fifth, sixth and seventh switch means includes two switches one of which is coupled to said coding means, the remaining switches of each of said plurality of switch means and of said second and third switch means being coupled at least partially in parallel groups, said groups being serially connected, the operation of predetermined ones of said second, third, fourth, fifth, sixth and seventh switch means being effective to establish a line of continuity, said light projectable field including one additional transparent area opaquely outlined, an additional light sensitive device disposed to receive projected light through said outlined area only when said light projectable field is in a predetermined position, additional switch means associated with said additional light sensitive device and actuated thereby when the additional light sensitive device receives light, means coupling said line of continuity to the additional switch means, and means coupling said additional switch means to the sequential energizing means for starting the sequential operation thereof.

7. In a data processing system wherein there are a plurality of input-output devices each operable by a different ticket agent to communicate with a central computer, an input-output device comprising a cartridge, a plurality of film slides in said cartridge, each slide having different predetermined information thereon including printed information and coded information in the form of a plurality of areas encoded opaque or transparent in accordance with a predetermined code, means for selecting one of said slides including means for removing a selected slide from said cartridge and placing the selected slide in a predetermined position, means for projecting light through a selected slide, screen means for receiving the projected printed information and visually displaying same, each of said slides including an opaquely outlined transparent spot disposed in a predetermined location on said slide, a different light sensitive device for each of said encoded areas and one for said transparent spot, the latter device receiving light only when a selected slide is correctly positioned, a plurality of relays the coils of which are respectively serially connected with said light sensitive devices so as to operate the respective relays when the associated light sensitive device receives projected light, each relay having a switch operated by the respective relay coil, the total number of relay switches except the one associated with the correct positioning light sensitive device being divided into groups thereof with each said group having the same number of said relay switches, a plurality of output lines, one switch in each of said groups thereof being connected to a different one of said output lines, means for sequentially energizing said groups of relay switches to provide given sequential groups of binary signals on said output lines in accordance with whether the connected relay switch is operated or not by the associated light sensitive device, said output lines being coupled to said computer whereby the sequential groups of binary signals are operative to identify a given program which the computer is to follow, said printed information being in the form of a timetable and designating a plurality of differently numbered trips as between a plurality of different origin and destination designations, a column of manually operable origin switch means and a column of manually operable destination switch means adjacent said screen means, a row of manually operable trip number switch means disposed adjacent said screen means, a group of manually operable transaction switch means, a group of manually operable seat indicating switch means, a group of manually operable units date indicating switch means, a group of manually operable tens date indicating switch means, each of said switch means including at least first and second switches, coding means coupled to said output lines and having a plurality of input lines, one switch of each of said switch means in each group thereof being connected to a different one of the input lines of said coding means, said sequential energizing means being coupled to said first switches of each group of switch means for sequentially energizing same thereby causing other binary signals on said output lines in accordance with which of the switch means is operated in each group thereof and in accordance with the code predetermined by said coding means, the second switches of each group of switch means being connected in parallel to form groups of parallel connected second switches, each group of second switches being connected in series, means including third switches for a predetermined number of the transaction indicating switch means for bridging at least two of the parallel connected groups of second switches, the arrangement being such that manual operation of a predetermined number of switch means effects a line of continuity, said line of continuity being connected to the relay switch associated with the light sensitive device receiving light via said transparent spot, and means coupling said last mentioned relay switch to said sequential means for starting operation thereof, the arrangement being such that the binary groups of signals sequentially appearing on said output lines as the result of manual operation of given ones of said switch means are effective as addresses for selecting information stored in the computer, while the so selected information being then processed by the computer in accordance with said given program, means for receiving and decoding information from said computer, and means for indicating the decoded information.

8. An input device for use in a data processing system comprising at least one light projectable field having predetermined information thereon including printed information and coded information in the form of a plurality of areas encoded opaque or transparent in accordance with a predetermined code, means for projecting said predetermined information, screen means for receiving the projected printed information and visually displaying same, a plurality of output lines, a plurality of light sensitive devices respectively associated with said areas for receiving the projected coded information and effecting electrical signals in accordance with said code, means coupling said signals to said output lines sequentially by groups, a plurality of groups of manually operable switches, a different input line for each of said switch groups, coding means coupled between all of said switches and said output lines, and means for sequentially energizing the input lines of said switch groups to effect on said output lines a plurality of groups of coded electrical signals with each such group appearing on the output lines at a time different than any group of signals caused by said coded information, some of said groups of switches being disposed adjacent said screen means to effect onto said output lines coded electrical signals representative of certain of the projected printed information when the corresponding switch group input line is energized, the arrangement being such that said output lines receive successive groups of coded electrical signals with those derived from the light sensitive devices being an identification of all of the projected coded information, while those derived from the operation of any one switch in any group thereof is an identification of an operation to be effected relative to certain parts of said printed information.

9. An input device as in claim 8 and further including at least one other switch operable with each of the aforementioned switches, said other switches being connected in parallel to form corresponding second switch groups which are serially coupled together, an opaque outlined transparent area on said light projectable field, another light sensitive device and switching means coupled thereto and further coupled in series with said second switch groups and to the means for causing sequential energization of the first mentioned switch group input lines and the means for sequentially coupling signals to said output lines from the actuation of the first mentioned light sensitive devices, for starting the sequential operation thereof but only when the light projectable field is positioned to allow light to fall on its respective light sensitive device to cause the switching means associated therewith to be operated and a line of continuity is established serially through the second switch groups by operation of certain switches therein.

10. An input device as in claim 8 and further including a cartridge containing a plurality of different light projectable fields each having different predetermined information thereon including printed information and coded information, means for moving said cartridge so as to position any one of said fields at a given point, means for selecting for projection purposes the one of said fields which is at said given point including means for removing that field from said cartridge and returning it thereto, the arrangement being such that for each different field projected, the code of the different output signals derived from the light sensitive devices is different.

11. An input-output as in claim 10 wherein the selecting means includes a lever and at least one hook operatively connected together, and wherein each of said fields is in a frame having means for receiving said hook.

References Cited in the file of this patent
UNITED STATES PATENTS

| | | |
|---|---|---|
| 2,124,906 | Bryce | July 26, 1938 |
| 2,294,734 | Bryce | Sept. 1, 1942 |
| 2,358,051 | Broido | Sept. 12, 1944 |
| 2,564,410 | Schmidt | Aug. 14, 1951 |
| 2,622,142 | Jackel | Dec. 16, 1952 |
| 2,783,454 | North | Feb. 26, 1957 |
| 2,785,388 | McWhirter et al. | Mar. 12, 1957 |
| 2,817,824 | Albright | Dec. 24, 1957 |
| 2,874,497 | Huff | Feb. 24, 1959 |
| 2,883,106 | Cornwell | Apr. 21, 1959 |
| 2,898,807 | Edwald | Aug. 11, 1959 |

OTHER REFERENCES

Control Engineering, December 1956, pp. 70–76, Brown et al.